United States Patent
Golden

(10) Patent No.: US 6,925,631 B2
(45) Date of Patent: Aug. 2, 2005

(54) METHOD, COMPUTER SYSTEM AND COMPUTER PROGRAM PRODUCT FOR PROCESSING EXTENSIBLE MARKUP LANGUAGE STREAMS

(75) Inventor: Richard Golden, Sulz am Eck (DE)

(73) Assignee: Hewlett-Packard Development Company, L.P., Houston, TX (US)

( * ) Notice: Subject to any disclaimer, the term of this patent is extended or adjusted under 35 U.S.C. 154(b) by 544 days.

(21) Appl. No.: 09/733,153

(22) Filed: Dec. 8, 2000

(65) Prior Publication Data

US 2002/0073399 A1 Jun. 13, 2002

(51) Int. Cl.[7] .............................................. G06F 9/44
(52) U.S. Cl. ...................................... 717/115; 715/513
(58) Field of Search ................. 717/106–116, 120–123; 715/513–525

(56) References Cited

U.S. PATENT DOCUMENTS

| | | | | |
|---|---|---|---|---|
| 6,125,391 A | * | 9/2000 | Meltzer et al. | 709/223 |
| 6,205,407 B1 | * | 3/2001 | Testa et al. | 702/119 |
| 6,434,529 B1 | * | 8/2002 | Walker et al. | 704/275 |
| 6,569,207 B1 | * | 5/2003 | Sundaresan | 715/513 |
| 6,675,354 B1 | * | 1/2004 | Claussen et al. | 715/513 |
| 6,704,736 B1 | * | 3/2004 | Rys et al. | 707/100 |

OTHER PUBLICATIONS

Extensible Markup Language (XML) 1.0, W3C Recommendation Feb. 10, 1998, (http://www.w3.org/TR/REC–xml, visited Mar. 9, 2001.

Hiroshi Maruyama, et al., "XML and Java Developing Web Applications", pp. 13–30, 97–141, 186–228, 2nd Edition, 1999.

J. Robie, "What is the Document Object Model?", (http://www.w3.org/TR/REC–DOM–Level–1/introduction.html), pp. 1–4, visited Aug. 3, 2000.

M. Champion, "1. Document Object Model (Core) Level 1", (http:www.w3.org/TR/REC–DOM–Level–1/Level–one–core.html), pp. 1–25, visited Aug. 3, 2000.

E. Pelegri–Liopart, "JavaServer Pages Specification", 1st Edition, Sun Microsystems, Nov. 1999.

* cited by examiner

*Primary Examiner*—Kakali Chaki
*Assistant Examiner*—Lawrence Shrader

(57) ABSTRACT

The invention is directed to a method performed by a computer system to process an extensible markup language input stream using discrete software components mapped to tags contained in the input stream, comprising: parsing the input stream; as a tag is parsed, invoking the software component mapped to it. The invention is also directed to a computer system, comprising: a processing unit and storage for processing programs; bindings representing a mapping between tags and discrete software components; a software engine comprising: a reader component that reads an extensible markup language input stream containing at least one tag; a parser component that parses the input stream; an execution component that, as a tag is parsed, invokes the software component mapped to the tag. The invention is also directed to a corresponding computer program product.

19 Claims, 9 Drawing Sheets

```
<order>
    <customer
        id="123-456" />
    <item>
        <product
            code="123" />
        <quantity
            units="ea"
            value="3" />
    </item>
</order>
```

METHOD, COMPUTER SYSTEM AND COMPUTER PROGRAM PRODUCT FOR PROCESSING EXTENSIBLE MARKUP LANGUAGE STREAMS

FIELD OF THE INVENTION

The present invention relates generally to the processing of tokenized data streams, and more particularly to a method, a computer system and a computer program product for processing extensible markup language streams.

BACKGROUND OF THE INVENTION

A markup language represents a hierarchical structure for a document by identifying markup on "tags". For example, the HyperText Markup Language (HTML) focuses on expressing the presentation of a document (i.e. its formatting and displaying), for example sections, subsections, sidebars and images by attaching corresponding tags to individual words, paragraphs etc. Markup languages allow documents to be exchanged among applications. For example, HTML documents are widely used in the request-response protocol of what is called the World Wide Web (i.e. the Internet with the HyperText Transfer Protocol (HTTP) protocol suite). Normally, when a HTTP server in the Web receives a HTTP request, it sends a HTTP response with an embedded HTML document to the HTTP client ("browser") from which the request originates. The browser processes the HTML document and, thus, displays it on a graphical user interface according to the presentation information contained in the document.

HTML has proven quite limiting because it focuses on the presentation of documents rather than representing their internal structure, and has a fixed set of tags. Extensible markup languages can solve this problem of limited flexibility of HTML. Under the auspices of a consortium that creates de facto standards for the Web, the World Wide Web Consortium (W3C) a new markup language called XML was defined in 1996 (see: Extensible Markup Language (XML) 1.0 W3C Recommendation Feb. 10, 1998", http://www.w3.org/TR/REC-xml). With XML, a user can define his own set of tags. The definition of these tags can be contained in a Document Type Definition, or DTD. One of the validity constraints specified in the XML 1.0 Recommendation is that all tags of a document are defined in the DTD which is referenced in an XML document.

In the beginning, XML was thought of mainly as the language for metacontent. Metacontent is information about a document's contents, such as its title, author, revision history, keywords, and so on. Metacontent can be used, for example, for searching, information filtering and document management. Another interesting application relates to databases. If data is delivered as an document that preserves the original information, such as column names and data types, as is the case with XML, it can be used for other purposes than just displaying on the screen, for example, to do some computation. A further application area of XML is messaging, i.e. the exchange of messages between organizations (B2B messaging) or between applications systems within an organization. These applications are, for example, described in H. Maruyama et al.: XML and Java, 1999, pages 13 to 30.

It has also been proposed that the information contained in an XML document is used as processing instructions for certain procedures. For instance, Maruyama et al. gives an example of how XML can be used to interface with a database:

A SQL (Standard Query Language) query is embedded in an XML document. When, the XML document is parsed by an XML processor, a DOM (Document Object Model) representation of the XML document is generated in the memory of the processing computer system. DOM is an application programming interface (API) for XML documents (see J. Robie (Ed.): What is the Document Object Model?, REC-DOM-Level-1-1981001, http://www.w3.org/TR/REC-DOM-Level-1/introduction.html and M. Champion et al. (Eds.): Document Object Model (Core) Level 1, REC-DOM-Level-1-19981001, http://www.w3.org/TR/REC-DOM-Level-1/level-one-core. html). When using DOM, the tag structure of an XML document is converted in a tree-like memory structure, called a "DOM tree". After the parsing of the XML document has been completed and the corresponding DOM tree is generated in the memory, the DOM tree is processed by visiting all nodes of the tree. When the node with the SQL query is visited, it is executed, i.e. the database is accessed (H. Maruyama et al., pages 97–141, 185–228).

Another similar example of how XML documents are processed is the JavaServer Pages Technology by Sun Microsystems, Inc. (see E. Pelegrí-Llopart et al.: JavaServer Pages Specification, version 1.1, Nov. 30, 1999). (JavaServer Pages is a trademark of Sun Microsystems, Inc.). The JavaServer Pages (JSP) technology enables the authoring of Web pages that create dynamic content. A JSP page is a text-based document that describes how to process a request to create a response. JSP pages are compiled to what is called servlets and respond to HTTP requests. An input received from HTTP POST or QUERY arguments can be in the form of an XML document. Such an input is first parsed by an XML parser, and a corresponding DOM tree is generated in memory. Then, JavaBeans components, Enterprise JavaBeans components, or custom actions can be invoked (see Pelegrí-Llopart et al., page 31). This corresponds in principle to the method for interfacing databases proposed by Maruyama et al.

SUMMARY OF THE INVENTION

A method performed by a computer system to process an extensible markup language input stream uses discrete software components mapped to tags contained in the input stream. The method comprises parsing the input stream, and, as a tag is parsed, invoking the software component mapped to it.

According to another aspect, a computer system comprises a processing unit and storage for processing programs, bindings representing a mapping between tags and discrete software components, and a software engine. The software engine comprises a reader component that reads an extensible markup language input stream containing at least one tag, a parser component that parses the input stream, and an execution component that, as a tag is parsed, invokes the software component mapped to the tag.

According to still another aspect, a computer program product includes program code for execution on a computer system. The program code is capable of processing an extensible markup language input stream using discrete software components mapped to tags contained in the input stream. The program code directs the computer system to parse the input stream; as a tag is parsed, invoke the software component mapped to it.

Other features are inherent in the disclosed method, computer system and computer program product or will become apparent to those skilled in the art from the following detailed description of embodiments and its accompanying drawings.

DETAILED DESCRIPTION OF THE PREFERRED EMBODIMENTS

Figures 1, 2:
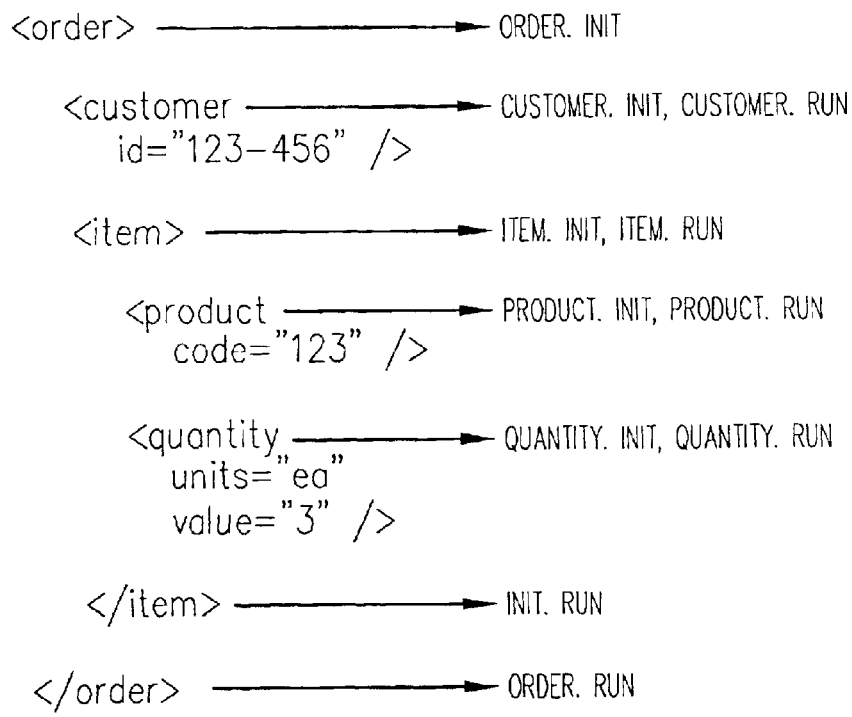
FIG. 1 shows a fragment of an XML document.
FIG. 2 illustrates that the tags of the XML document fragment of FIG. 1 are mapped to classes of an object-oriented programming language.

FIG. 1 shows an example of an extensible markup language input stream in the form of a fragment of a XML document. Before proceeding further with the description, however, a few items of the preferred embodiments will be discussed.

A "markup language" describes a class of data objects which are at least partly made up of characters, some of which form character data, and some of which form markup. Markup takes, for example, the form of start-tags, end-tags, empty-element tags, entity references, character references, comments, CDATA sections, delimiters and document type declarations. Logical structures of the document are defined by what are called tags. A tag is commonly constituted of a start-tag and an end-tag, or by an empty-element tag. Whereas in HTML the set of available tags is limited (it can only be extended by a standardization body, as the World Wide Web Consortium), the term "extensible" refers to a markup language's ability to have new markup tags freely defined by users, customized to particular purposes. The definition of these tags can be contained in a DTD. The DTD can be published and thereby be made available to anyone wanting to use documents with these customized tags. The extensible markup language used in the preferred embodiments is XML. However, other extensible markup languages, like SGML, the Standard Generalized Markup Language (ISO 8879) can also be used.

The term "stream" covers documents and messages and parts of them, as well as a (quasi-)infinite series of data or messages, for example in work flow or multimedia applications.

"Parsing" is the process of reading an input stream and dissecting it into elements that can be analyzed. Unlike the methods discussed in the background section in which first the entire document is parsed and transformed into a DOM tree in memory, and only then, in a second pass over the DOM tree, the actual processing of the representation of the document information (e.g. database interfacing) is performed, in the disclosed embodiments the process of parsing and document processing is one-pass. That is, the invocation of software components mapped to the tags is performed during the parsing process. This means that "behavior" induced by invoking the software components is already generated during the input stream is parsed (for the first) time, and not only after it has been parsed. The preferred parser (an event-driven Application Programming Interface (API)) is the "simple API for XML" (SAX) parser. SAX has been developed by David Megginson et al. Although not sanctioned by any standards body, SAX is widely used because of its simplicity. It can be downloaded from http://www.megginson.com/SAX/.

In some of the preferred embodiments the input stream is parsed and processed only once. However in other embodiments, one and the same input stream can be parsed and processed more than once (e.g. twice). For example, if the bindings in the second pass of combined parsing and processing are different from the first pass, the results of the first combined parsing and processing will differ from those of the second parsing and processing.

It is not necessary that all tags contained in the input stream are mapped to a discrete software component. Rather, if a tag which is not mapped is parsed, no software component or a software component that does nothing is invoked. For the tags which are mapped, in the disclosed embodiments, the mapping is a single-valued function. In other words, each mapped tag is mapped to only one (rather than to two or more) software component, but it may be that two or more tags are mapped to the same software component. However, in the most preferred embodiments there is a one-to-one mapping between all mapped tags and software components. In other words, to each mapped tag corresponds exactly one software component.

In the preferred embodiments, the discrete software components are classes of an object-oriented programming language, like Java (Java is a trademark of Sun Microsystems, Inc.). They can likewise be procedures or functions of a procedural programming language.

In the applications mentioned in the background section, a DOM tree which corresponds to the entire XML input document is built before the actual processing of the document is performed. This is because behavior (as, for instance, a database access is only generated by a second pass over the generated DOM tree. In contrast to such a recursive processing, in the preferred embodiments the behavior is generated during the input stream is parsed, which requires only a single pass. Of course, it is not excluded that a hierarchical memory structure, like a DOM, tree is also built during the parsing. This is, in fact, done in the preferred embodiments. One of the reasons for building a DOM tree is that a tag generally has a start-tag and an end-tag which may have many sub-tags (children). In a XML document, the children are bracketed between the start-tag and the end-tag. As behavior may be invoked when the start-tag or the end-tag or both are parsed and, may depend on the children of a tag, it is advantageous to keep track of all start-tags and their children, at least until they are closed by their corresponding end-tag. To this end, preferably a hierarchical tree structure (i.e. a DOM tree) in built during the parsing.

As explained above, a tag of the extensible markup language input stream is generally formed by a pair of a start tag and an end tag, which have optionally one or more children. In the preferred embodiments, the discrete software components comprise a method, which is invoked as the start-tag of a tag, is parsed (called "init method") and a further method, which is invoked as the end-tag of a tag, is parsed, i.e. after all children of the tag (possibly zero) have been parsed (called "run method"). For example, the init method may be a conditional call, as a data validity check. When the run method is invoked, the program has already an awareness of all children of the tag since they have already been parsed by this time.

Generally, the syntax of a programming language is fixed. In the disclosed embodiments, however, the mapping between the tags and the discrete software objects can be easily changed before, after or even during the parsing process. Consequently, the "behavior" that is induced by a certain tag is not fixed, but can be changed depending on the context in which the input stream is parsed, or any other internal or external conditions. The bindings may even be changed depending on events that occurred in the same input stream. A markup language which flexibly binds behavior to tags can be considered as a "dynamic programming language".

For complex applications, like workflow applications, the disclosed XML processing method can be queued. If one considers a reader component, a parser component and an execution component (and, optionally, further components not listed here) as one XBF engine, then two or more of such XBF engines can then work in series. One XBF engine generates an extensible markup language output stream which is used as an input stream for another XBF engine. The generation of the output stream by the first XBF engine can be a result of the invoking of one or more of the software components which are mapped to tags of the input stream and are capable of transforming XML input into a (normally different) XML output. Alternatively, the output stream can be generated in a "second pass" using the hierarchical memory structure which corresponds to the XML input stream, since in the present context it is not necessary that all the "behavior" is already induced during the parsing of the input stream. Rather, it is also possible that a part of the behavior, for example the transformation of the input stream into the output stream, is only performed in a second pass.

There are a number of important applications for the disclosed embodiments of the method, computer system and computer program product. In a first application, the computer system is a server in a network, and the extensible markup language input stream is processed by the server. It can, for example, be comprised in a request received over the network from a client. As a tag of the input stream is parsed, the software component mapped to it is invoked, for example, a software component for accessing a database. Information retrieved from the database may then be built into a document page (e.g. a HTML document page) to form a response to the client's request. Another possible source for XML input is a database, since data can advantageously be stored in databases in the form of XML documents or document fragments. Such an XML database output forms an input for the disclosed embodiments, and as a tag is parsed, a software component mapped to it is invoked. Again, this could be used to generate a response to a client's request (which could be a conventional HTML request).

Another application is the use of XML as a query language. To this end, the invoked software components comprise at least one software component for interfacing with a database. In contrast to the proposal of MARUYAMA et al. mentioned at the outset, the database-interfacing software components are invoked during the parsing process, as the corresponding tags of the input stream are parsed.

Another application of the disclosed embodiments is messaging, in particular the dispatch of bulk e-mail or facsimile. To this end, the invoked software components comprise at least one software component for sending electronic mail and/or for sending facsimiles.

A still further application is remote computing. In a disclosed embodiment, the computer system comprises a local computer and a remote computer, which communicate which each other. Commands given to the local computer are executed on the remote computer. However, the results of the execution are output on the local computer so that the commands appear to be executed locally. The communication between the local and the remote computers comprises the transmission of tokenized data streams, as XML streams. The disclosed method for processing XML input is performed on the local computer or on the remote computer or on both. Processing on the remote computer comprises executing the commands received from the local computer. Processing on the local computer comprises outputting the results received from the remote computer, e.g. on a Graphical User Interface.

The disclosed embodiments of the computer program product comprise the disclosed program code which, for example, is stored on a computer-readable data carrier or is in the form of signals transmitted over a computer network. The program code comprises the following classes: a class which parses the input stream (named TagletEngine), a class which implements a parser interface (named TagletDocumentFactory), a class which creates a document (named TagletDocument), a class which creates "Taglets" (named TagletFactory), a class which provides behavior for the Taglets (named Taglet).

FIG. 1 shows an example of an extensible markup language input stream, here a fragment of a XML document which represents a small section of an order. An order tag has a start-tag and an end-tag and two children: A "customer" tag, which is an empty-element tag and an "item" tag having a start-tag and end-tag. The "customer" tag has an attribute specification, whose name is "id", and whose value is a string representing a customer identifier. The "item" tag has two children, a "product" tag and a "quantity" tag, which are both empty-element tags. The "product" tag has an attribute specification the name of which is "code" and a number which represents the code. The "quantity" tag has two attribute specifications, "units" and "value". Their values represent the names of the units and a number representing their value, respectively.

FIG. 2 illustrates that the tags of the XML fragment of FIG. 1 are mapped to classes of an object-oriented programming language by arrows pointing from each tag to a class. More specifically, the arrows point to "init" methods at the start-tags and to "run" methods at the end-tags. In FIG. 2, the classes assigned to the tags have the same name as the classes, but start with a capital letter. When the parser has, for example, parsed the start-tag of the tag "order", the init method of a class "Order" is invoked. Then, when the parser has parsed the tag "customer", the init method of a class "Customer" is invoked. Since the tag "customer" has no children (it is an empty-element tag), the run method of the class "Order" is invoked immediately after the init method. The attribute "id" of the "customer" tag named can be used by the Customer class. Then, the init method of the class "Item" is invoked when the parser parses the "item" start-tag.

Then, when the "product" and "quantity" tags are parsed, the init and run methods of the classes "Product" and "Quantity" are invoked, since these two tags are again empty element-tags. The attributes of the "product" and "quantity" tags ("code", "units" and "value") can be used in the corresponding invoked classes. Then, when the end-tags of "items" and "order" are passed, the run method of the classes "Item" and "Order" are invoked. This way of processing an XML document is in contrast to the prior art described in the background section, in which the only result of parsing an XML input document would be the generation of a DOM tree. In this prior art, a behavior could only be generated upon a "second pass", which goes over the nodes of the DOM tree generated during the first parse.

Figure 3:
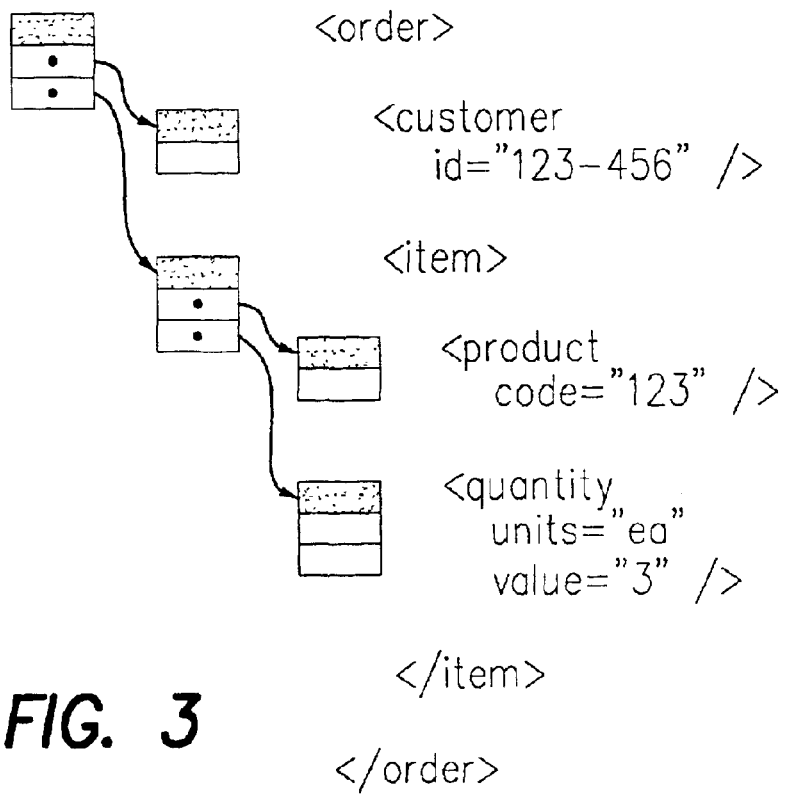
FIG. 3 illustrates a DOM representation of the XML document fragment of FIG. 1.
Figure 4:
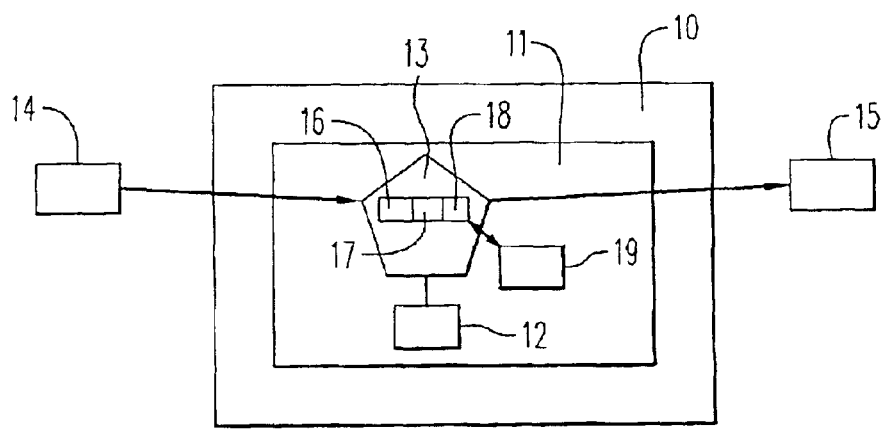
FIG. 4 shows a high level architecture diagram of a computer system.

However, also in the disclosed embodiments a DOM tree is built during the parsing process. The main purpose of that is to achieve that the program has "awareness" of all children of a tag when the tag's end-tag is parsed and the corresponding run method is invoked. FIG. 3 illustrates a DOM tree which resembles the structure of the XML document fragment of FIG. 1. A DOM representation is a hierarchical, tree-like structure generated, for example, in the memory of the disclosed computer system. (Details of the Document Object Model (DOM) can be taken from Robie and Champion et al.) The order tag of FIG. 1 is represented by a root node named order. It has two child nodes named customer and item, which represent the corresponding tags of FIG. 1. The customer node has an attribute (id="123–456"), whereas the item note has two child nodes, product and quantity, which represent the corresponding tags of FIG. 1. The products and quantity nodes have the attributes "code="123" as well as units="ea" and value="3", respectively FIG. 4 illustrates a computer system 10 with a processing unit and storage 11 for processing programs. Bindings 12 which represent a mapping between tags and discrete software components are stored in the computer system 10 or are retrieved by it from a database (which may be a local database or a remote database accessed via a network). Further, the computer system 10 has a software engine 13, which is also called "XBF engine" (XBF stands for "XML Behavior Framework"). An XML input stream 14 is input into the XBF engine 13, and, in some embodiments, an XML output stream 15 is output by it. The XBF engine 13 comprises a reader component 16, which reads the XML input stream 14, a parser component 17, which parses the read input stream, and an execution component 18, which, as a tag in the input stream is parsed, invokes the software component mapped to it by the bindings 12. All such software components are represented by a box 19 in FIG. 4.

Figure 5:
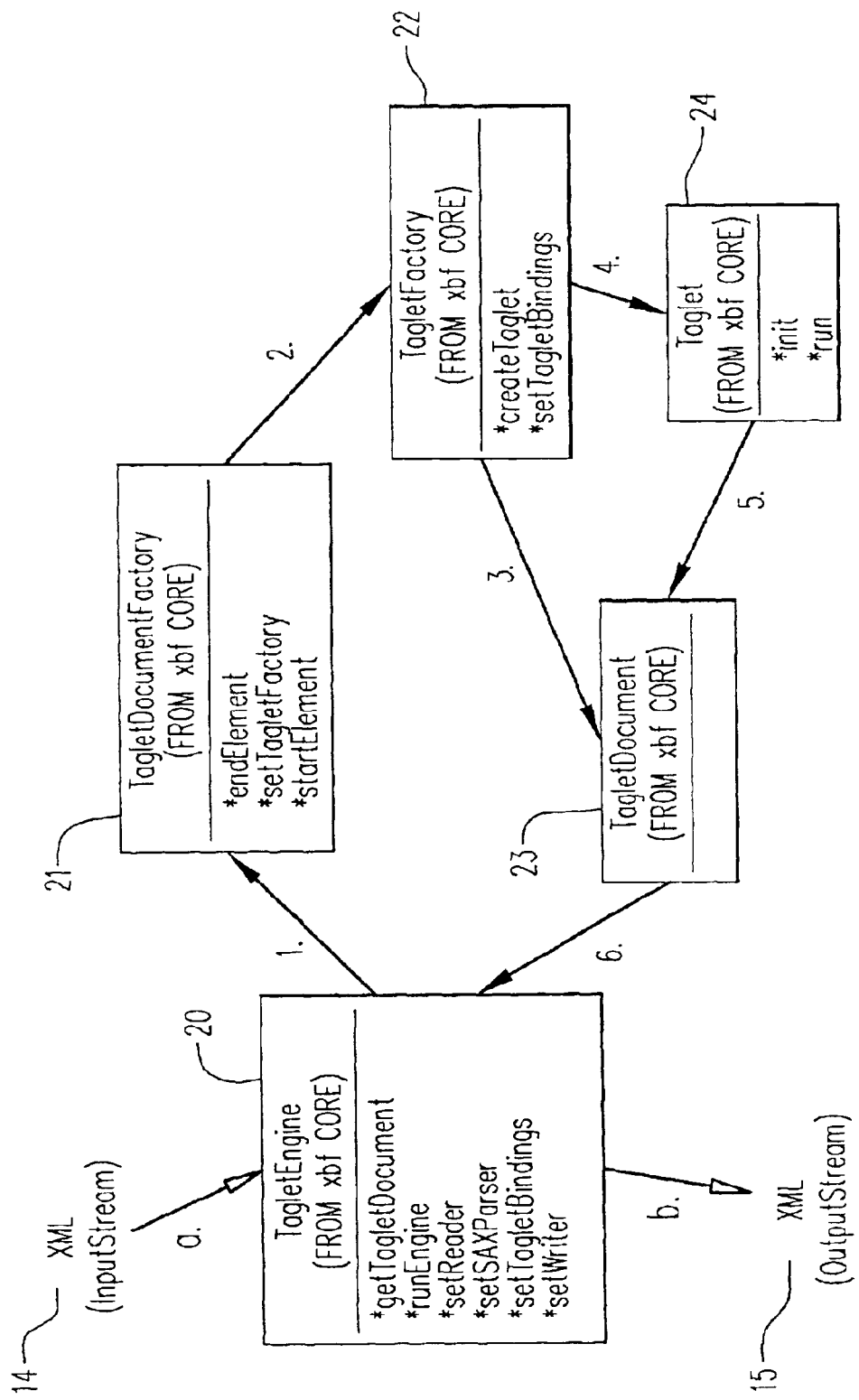
FIG. 5 is a diagram of the core classes of a computer program for processing an XML input stream.

FIG. 5 is a diagram of the core classes of a computer program for processing an XML input stream which will be described in detail below.

The XBF program is written in JAVA. A simple example of a XBF main program, test. java, is shown below in listing 1.

Class Test
Listing 1: Test.java: XBF main program
```
    import xbf.core.Taglet;
    import xbf.core.TagletEngine;
    import java.io.InputStreamReader;
    import java.io.OutputStreamWriter;
    import java.io.Reader;
    import java.io.StringReader;
    import java.io.StringWriter;
    import java.io.Writer;
    import java.util.Dictionary;
    import java.util.Hashtable;
class Test
{
    /* Do nothing constructor */
    public Test( )
    {
    super( );
    }
    public static void main(String[ ] args)
        throws Exception
    {
[11] Reader stringReader=new StringReader("<foo><hello/></foo>");
    StringWriter stringWriter=new StringWriter( );
    java.util.Dictionary bindings=new Hashtable( );
[18] bindings.put("hello", "TestTaglet");
[20] TagletEngine engine=new TagletEngine( );
[22] engine.setTagletBindings(bindings);
    engine.setReader(stringReader);
    engine.setWriter(stringWriter);
[25] engine.runEngine( );
    System.out.println(stringWriter.toString( ));
    System.exit(0);
    }
}
```

The main purpose of an XBF main program is to read in the XML input stream and the bindings and to invoke a class TagletEngine. However, to make the present example simple, the XML input stream is not read in, but is defined in-line in the XBF main program:
[11] Reader stringReader=new StringReader("<foo><hello/></foo>");

In line [11], the XML input stream is made up of a foo tag (formed by a start-tag and an end-tag). The foo tag has one child, which is an empty-element tag hello.

Next, the bindings which represent the mapping between tags and discrete software components to be invoked, are entered into the program (a binding is, for example, a tuple of a tag name and an "object", for instance a name of a Java class). Generally, the bindings are entered by accessing a file or a database. In order to make the present example simple, only one binding is entered, again by an in-line definition:
[18] bindings.put("hello", "TestTaglet");

In line [18], an object TestTaglet is mapped to the hello tag. No object is mapped to the foo tag.

Then, the program creates an instance engine of class TagletEngine:
[20] TagletEngine engine=new TagletEngine( );

After the XML input and the bindings have been passed to engine,
[22] engine.setTagletBindings(bindings);
the method runEngine of the class TagletEngine is invoked for engine:
[25] engine.runEngine( );

In FIG. 5, the main program is indicated by an arrow "a" which symbolizes that the class TagletEngine is invoked and the XML input stream is passed to it. The class TagletEngine and its relevant classes are illustrated by box 20 in FIG. 5. Listing 2 shows the core of the class TagletEngine, mainly the runEngine method.

Class TagletEngine
Listing 2: TagletEngine.java: Parses the inputstream
```
    package xbf.core;
    import java.io.InputStreamReader;
    import java.io.OutputStreamWriter;
    import java.io.Reader;
```

```
import java.io.Writer;
import java.util.Dictionary;
import java.util.Hashtable;
import com.sun.xml.tree.ElementNode;
import com.sun.xml.tree.XmlDocumentBuilder;
import com.sun.xml.tree.XmlDocument;
import org.xml.sax.DocumentHandler;
import org.xml.sax.InputSource;
[13] import org.xml.sax.Parser;
public class TagletEngine
{
public void runEngine( )
throws java.io.IOException,
    org.xml.sax.SAXException
{
// Set defaults.
[22] useDefaultSAXParser( );
   useDefaultTagletBindings( );
   useDefaultTagletFactory( );
   useDefaultTagletDocumentFactory( );
   useDefaultReader( );
   useDefaultWriter( );
   // The taglet factory is the parser's document handler.
[30] getSAXParser( ).setDocumentHandler(
   getTagletDocumentFactory( ));
   // Parsing the input document triggers taglet behavior
[34] getSAXParser( ).parse(new InputSource(getReader(
   )));
   // Write the document out
[37] getTagletDocumentFactory( ).getTagletDocument( ).
      write(getwriter( ));
   return;
}
}
```

The SAX parser, an event-driven API, is used for the parsing process. The application registers an event handler to a parser object that implements the org.sax.Parser interface. The event handler interface DocumentHandler is called whenever an element is found in the input stream.

First, the Parser interface is imported:
[13] import org.xml.sax.Parser;

Next, an instance of a SAX driver is created:
[22] useDefaultSAXParser( );

Next, an instance of class TagletDocumentFactory is registered as a DocumentHandler:
[30] getSAXParser( ).setDocumentHandler(
  getTagletDocumentFactory( ));

Then, the input stream is parsed:
[34] getSAXParser( ).parse(new InputSource(getReader(
  )));

Upon parsing the input stream, a DOM representation of it is created. As an XML tag is found, an object (e.g. a JAVA class), as defined by the corresponding binding, is bound to the DOM tree for the specific tag. A tag with behavior (e.g. a JAVA class) bound to it is called a "taglet". As will be explained in more detail below, a init ( ) method is invoked on the taglet. After all of the taglet's children (possibly zero) have been added to the DOM representation, the taglet's run ( ) method is invoked.

After the input XML document has been entirely parsed, the DOM representation is written out again as an XML document:
[37] getTagletDocumentFactory( ).getTagletDocument( ).

The class TagletDocumentFactory is illustrated in FIG. 5 by box 21 and its core is listed below. Its creation is symbolized by an arrow 1. and completely in the appendix. The class TagletDocumentFactory implements the DocumentHandler interface and defines the methods which are associated to the different element types that appear during the parsing process, like the start or end of the document or the appearance of an start-tag or an end-tag.

Class TagletDocumentFactory

Listing 3: TagletDocumentFactory.java: Implements the parser interface

```
    package xbf.core;
    import java.util.Hashtable;
    import java.util.Stack;
    import org.w3c.dom.Node;
    import org.xml.sax.AttributeList;
    import org.xml.sax.DocumentHandler;
    import org.xml.sax.Locator;
[9] public class TagletDocumentFactory implements DocumentHandler
   {
[11] public void startDocument( )
      throws org.xml.sax.SAXException
   {
   // create an empty document
[16] TagletDocument document=new TagletDocument( );
   // the document generated by this factory
      setTagletDocument(document);
   // ensure that new elements are created from this factory
      document.setTagletFactory(getTagletFactory( ));
   return;
   }
[27] public void startElement
      (String name, AttributeList attributes)
      throws org.xml.sax.SAXException
   {
   // create a new taglet
[33] Taglet newTaglet=getTagletFactory( ).createTaglet
      (name, attributes);
   // if there exists a parent taglet
[37] if (! getInheritanceStack( ).empty( ))
      {// append the new taglet to the parent
      // get parent taglet
[41] Taglet parentTaglet=(Taglet) getInheritanceStack(
      ).peek( );
      // append the new taglet
[45] parentTaglet.appendChild(newTaglet);
      }
   else
      {// taglet is document root
[49] getTagletDocument( ).appendChild(newTaglet);
      }
   // the new taglet becomes the parent for the next taglet
[53] getInheritanceStack( ).push(newTaglet);
   // initialize the taglet
[56] newTaglet.init( );
   return;
   }
[61] public void endElement(String name)
      throws org.xml.sax.SAXException
   {
[65] Taglet taglet=(Taglet) getInheritanceStack( ).pop( );
   // Invoke the run( ) method on the Taglet being closed
[69] taglet.run( );
   return;
```

}
[74] public void endDocument( )
   throws org.xml.sax.SAXException
   {
   // Do nothing
   return;
   }
}
First, by the keyword implements, the interface DocumentHandler is applied to the class TagletDocumentFactory:
[9] public class TagletDocumentFactory implements DocumentHandler When the parser finds the start of a document, the method startDocument ( ) is invoked (line [11]). In this method, an instance document of class TagletDocument is created:
[16] TagletDocument document=new TagletDocument( );

When the parser finds a start-tag or an empty-element tag, the method startElement is invoked (line [27]). First, a new taglet is created:
[33] Taglet newTaglet=getTagletFactory( ).createTaglet (name, attributes);

Then, in lines [33] to [53] the new taglet is built into a DOM tree structure InheritanceStack. To this end, first a distinction is made as to whether the new taglet already has a parent taglet or is the document root:
[37] if (! getInheritanceStack .empty( ))

If the parent taglet already exists, it is fetched (without removing it) from the InheritanceStack by the peek method of the Java collection class stack:
[41] Taglet parentTaglet=(Taglet) getInheritanceStack.peek( );

Then the new taglet is appended to the parent taglet:
[45] parentTaglet.appendChild(newTaglet);

Otherwise, the new taglet is appended to the document root:
[49] getTagletDocument( ).appendChild(newtaglet);

Then, the new taglet is pushed onto the InheritanceStack so that it becomes the parent for a next taglet (by method push of class Stack):
[53] getInheritanceStack( ).push(newTaglet);

Finally, the new taglet is "initialized", which means that the method init ( ) is invoked for newTaglet of class Taglet:
[56] newTaglet.init( );

When the parser finds an end-tag or an empty-element tag, the method endElement is invoked (line [61]). Children may appear between a start-tag and an end-tag so that the method startElement will be called a corresponding number of times for new taglets (child taglets) before the method endElement will be called for the taglet in consideration.

First, the taglet is fetched and removed from the InheritanceStack by the pop method of class Stack:
[65] Taglet taglet=(Taglet) getInheritanceStack( ).pop( );

Then, the run method of class Taglet is invoked on the taglet which is closed by the end-element tag found by the parser:
[69] taglet.run( );.

The run method, which is the counterpart to the init method is invoked: the former is invoked when the taglet is closed, the latter when the taglet is opened. Both methods bind "behavior" to a tag as it is parsed, as will be explained in more detail below.

When the parser finds the end of a document, the method endDocument is invoked (line [74]). This method does nothing.

The class TagletFactory is illustrated in FIG. 5 by box 22 and its core is listed below. Its creation is symbolized by arrow 2. Its method createTaglet (which is, for example, invoked in line [33] of TagletDocumentFactory listed above) generates taglets from tag names.

Class tagletFactory
Listing 4: TagletFactory.java: Creates taglets
   import java.util.Dictionary;
   import java.util.Enumeration;
   import java.util.Hashtable;
   import org.xml.sax.AttributeList;
   import com.sun.xml.tree.ElementFactory;
   public class TagletFactory
   implements ElementFactory
[11] public Taglet createTaglet(String tagName)
   {
   Taglet retval=null;
   Object boundObject=null;
   // bindings must not change between get and set synchronized (getTagletBindings( ))
   {
   // get the value bound to the tag name
[20] boundObject=getTagletBindings( ).get(tagName);
   // if the object is a class name
   if (boundObject instanceof String)
   // replace it with the Class
[25] boundObject=promote((String) boundObject);
   getTagletBindings( ).put(tagName, boundObject);
   }
   }
   // if the object is a Class
   if (boundObject instanceof Class)
   {// return an instance of the Class
[33] retval=instantiate((Class) boundObject);
   }
   // else if the object is a Taglet
   else if (boundObject instanceof Taglet)
   {// return deep clone of bound taglet
[38] retval=(Taglet)
       ((Taglet) boundobject).cloneNode(true);
   }
   else
   {// otherwise, use an plain Taglet
[43] retVal=new Taglet( );
   }
   // set tag name
[47] retVal.setName(tagName);
   return retVal;
   }
[52] public Taglet createTaglet
   (String tagName, AttributeList attributes)
   {
   // create a new taglet
[56] Taglet newtaglet=createTaglet(tagName);
   // for each passed attribute
   for (int i=0; i<attributes.getLength( ); i++)
   {// set the attribute on the new taglet
[62] newTaglet.setAttribute
       (attributes.getName(i), attributes.getvalue(i));
   }
   return newTaglet;
   }
   /* Promote a class name.
   The passed class name is promoted to a Class. */
[71] private static Class promote(String className)
   {
   return Class.forName(className);

}
}

The method createTaglet (line [11]) creates a new taglet from the binding boundObject stored in the taglet bindings dictionary:

[20] boundobject=getTagletBindings( ).get(tagName);

Objects in the initial taglet bindings dictionary may be one of three types: String, class or a taglet. Strings will be interpreted as class names and promoted to classes on first use (see the Promote method starting in line [71]):

[25] boundObject=promote((String) boundObject);

If the tag name is bound to a class an instance of that class is returned:

[33] retVal=instantiate((Class) boundobject);

If the tag name is bound to a taglet a deep clone of that taglet is returned:

[38] retVal=(Taglet)

Otherwise, a plain taglet is used:

[43] retVal=new Taglet( );

Finally, the name of the taglet is set to the tag name:

[47] retVal.setName(tagName);

The method createTaglet is overloaded: Whereas createTaglet of line [11] has one argument of the type String, the method createTaglet of line [52] has two arguments of types String and AttributeList. The method createTaglet with two arguments invokes the method createTaglet with one argument (line [56]) and sets the argument of the type AttributeList on the new taglet:

[62] newTaglet.setAttribute
 (attributes.getName(i), attributes.getvalue(i));

The Class TagletDocument, which is invoked when the parser finds the start of a document in class TagletDocumentFactory in line [16], is illustrated in FIG. 5 by box 23. The creation of an empty taglet document (a DOM document) is symbolized by an arrow 3.

The class Taglet, the methods of which are invoked as a taglet is parsed (for example in lines [56] and [69] of class TagletDocumentFactory) is illustrated in FIG. 5 by box 24 and is listed below. The creation of one taglet for each XML tag in the input stream is symbolized by arrow 4.

Class Taglet
Listing 5: Taglet.java: Provides behavior (init and run methods) for taglets

```
package xbf.core;
import com.sun.xml.tree.ElementNode;
public class Taglet
extends ElementNode
{
public Taglet( )
{
super( );
return;
}
public TagletDocument getTagletDocument( )
{
return (TagletDocument) getOwnerDocument( );
}
/** Initialize the taglet (tag open).
[17] public void init( )
{
}
/** Run the taglet (tag closed).
[21] public void run( )
{
}
void setName(String tagName)
{
setTag(tagName);
return;
}
}
```

The arrow 5 in FIG. 5 symbolizes that taglets are added to the taglet document. As each taglet is added to the taglet document, the taglet's init ( ) method is called. After all the taglet's children have been added to the taglet document, the taglet's run ( ) method is called. As the taglet document is written to the output stream (as XML), the taglet's toString( ) method is called.

The class Taglet has the methods init (line [17]) and run (line [21]) which, however, do nothing. In fact, the class Taglet is intended to be extended by the specific classes which are bound to the tags by the bindings.

In the present example, the class TestTaglet is bound to the tag name hello (see listing 1, line [18]).

As a simple example of such a specific class extending the class Taglet, the class TestTaglet is shown below in listing 6:

Class TestTaglet
Listing 6: TestTaglet.java: Extends Taglet

```
import xbf.core.Taglet;
[3] public class TestTaglet extends Taglet
{
public TestTaglet( ) {
super( );
}
[8] public void init( )
{
[10] System.err.println("TestTaglet.init( )");
return;
}
[13] public void run( )
{
[15] System.err.println("TestTaglet.run( )");
return;
}
}
```

The class TestTaglet extends the class Taglet (line [3]). In this simple example, the init method (line [8]) outputs only the string TestTaglet.init (line [10]). The run method (line [13]) outputs only the string TestTaglet.run (line [15]).

Finally, arrow 6 in FIG. 5 symbolizes that the taglet document is written to the output stream 15.

The several steps performed by the program described in connection with FIG. 5 are summarized and illustrated by the flow diagram of FIG. 6. First, an XML document to be processed and bindings which bind "behavior" (e.g. Java classes) to tag names are input into the program in Steps 30 and 31. In the above example of the main program test.java, the input document is <foo><hello/></foo>. There is only one binding which binds the class TestTaglet to the hello tag. There is no binding for the foo tag. In step 32, the parsing process is started. Parsing is an event-driven process. The events are items (or elements) in the input document. Generally, an input document contains more than one item. Step 32 and the following steps are carried out for each item and, thus, form a loop. If the loop is entered, in Step 32 the first item in the input document is parsed, otherwise the next item is parsed. In Step 33 it is checked whether the parsed item is the start of the input document. If the answer is affirmative, in Step 34 an empty DOM document is created in the memory of the computer system 10 which carries out the method. Then, the flow returns to Step 32 where the next item in the input stream is parsed.

If the answer in Step 33 is negative, it is checked in Step 35 whether the parsed item is a start-tag. If the answer is affirmative, in Step 36 a new taglet is created, i.e. behavior (a Java class) is bound to the tag. In Step 37, the taglet is appended in the DOM document to the previous taglet (or, if there is no previous taglet, it forms the document root) and pushed, so that it becomes the parent for a next taglet which will be appended when the program flow loops over Step 37 the next time. In Step 38 the taglet is "initialized", which means that the init method of that class, which is bound to the present tag is invoked. This generates that kind of "behavior" which is defined in the invoked init method. Then, the flow returns to Step 32 which parses the next item in the input document. If the current tag has at least one child, the next item parsed in Step 32 will again be a start-tag, which will again be processed through Steps 35 to 38, and so forth. After all the taglet's children (possibly zero) and sub-children etc. have been appended to the DOM representation and initialized by a corresponding number of cycles through Steps 35-38, an end-tag will be detected in Step 35 and 39. Then, in Step 40 the corresponding taglet is fetched and removed from the DOM tree. In Step 41, the method "runs" the taglet, which means that the run method of that class which is bound to the tag closed by the end-tag is invoked. This generates that kind of "behavior" which is defined in the invoked run method. Then, the flow returns to Step 32 where the next item in the input stream is parsed. The sequence of Steps 39 to 41 will be run through for each end-tag, i.e. for a number of times which corresponds to the number of initialization cycles through Steps 35 to 38. Apart from start and end of the document and start-tags and end-tags there may appear other events, like white space events, processing instruction node events, etc. This other events are found when the start-tag and end-tags check in Steps 35 and 39 are negative and the "other item" check in Step 42 is positive. They are processed in Step 43 from where the flow returns to Step 32. An empty-element tag is handled as a start-tag and a subsequent end-tag. Tags may have attributes which can be used as input variables for the init and run methods. Also data contained in the XML input document can be used as input for the init and run methods and be processed by them. The handling of attributes and data is evident for the skilled person.

If the end of the document is be detected in Step 44, the XML document stored in the memory (the DOM tree) is output in Step 45. In other embodiments (not shown), the output step 45 is omitted.

When the above XML document defined in Test.java of listing 1 is processed, first the start-tag of the foo tag is detected in Step 35. In Step 36 a foo taglet is created. Since no binding is defined for the tag name foo, the foo taglet is plain, i.e. the init and run methods bound to it do nothing. After the foo taglet has been added to the DOM tree in Step 37 and initialized in Step 38 (i.e. an "empty" init method is invoked), the cycle is finished and the next item in the input stream is parsed in Step 32. This next item is the hello tag, a child of the foo tag. The hello tag is an empty-element tag and is therefore considered as a start-tag followed by an end-tag. In Step 36, a hello taglet is created which means that the class TestTaglet is bound to the hello tag. In Step 37, the hello taglet is appended to the DOM tree and pushed. In Step 38, the hello taglet is initialized, which means that the init method of the class TestTaglet is invoked. As a result, the following string is output on the output device of the computer system (for example the screen):

TestTaglet.init( )

Then, since the empty-element tag hello is considered as a start-tag and a subsequent end-tag, in Step 40 the hello taglet is fetched and removed from the DOM tree. In Step 41 the method "runs" the hello taglet, which means that it invokes the run method of the class TestTaglet. As a result, the following string is written to the output device:

TestTaglet.run( )

Then, the next cycle starts in which, in Step 39, the end-tag of the foo tag is detected. In Step 40, the foo taglet is fetched and removed from the DOM tree. In Step 41 the run method of the foo tag is invoked, which, however, does nothing. Finally, as a result of Step 45, the stored DOM tree is output on the output-device:

<foo>
<hello/>
</foo>

It is clear from the above that the "behavior" is generated immediately during the parsing of the input document. If, for example, in the exemplary input document a further tag followed the hello tag the behavior of the hello tag (namely the printout of the strings TestTaglet.init( ) and TestTaglet.run( )) would be generated before the parsing of the other taglet commences. It is even possible that the bindings are changed during the parsing process, for example by the init or run method of a previous taglet (in such embodiments, Step 31 lies within the loop, as it is indicated by a dashed Line in FIG. 6).

In the following, several useful applications of the embodiments of FIGS. 1–6 are described. FIG. 7 illustrates examples in which the above-described embodiments are used for transforming an XML input stream into a different output stream. A XML input document 14 is received, for example, together with a HTTP request over the Internet or it is an output from a database. The XBF engine 13 processes the XML input document 14 as described in the context of FIGS. 5 and 6, using bindings 12 which define the mapping between tags in the XML input document 14 and classes (e.g. JAVA classes), which give "behavior" to the tags. In one the examples depicted in FIG. 7, the "behavior" is the translation of the XML input document 14 into a HTML output document 50. This translation process may be a one-to-one translation, only translating the XML representation into a HTML representation, without changing the information content of the input document 14. For example, the XBF engine 13 can be part of a web server which, upon a user's request, retrieves data from a database in the form of a XML document, processes this XML document (input document 14) and outputs the HTML document 50 as a response to the user's request, which will be send over the Web and displayed on the user's browser. Another example depicted in FIG. 7 is the transformation of the XML input document 14 into an e-commerce language document 51. The e-commerce language may be, for example, a special language as used by e-commerce or enterprise resource planning (ERP) applications, like BroadVision, ColdFusion, SAP. According to still another embodiment depicted in FIG. 7, the XML input document 14 is transformed into an XML output document 52. The XML output document 52 is not the output stream 15 shown in FIG. 4 or the XML document output in Step 45 of FIG. 6 since these outputs are a "mirror" of the XML input document. Rather, in the embodiment example, illustrated in FIG. 7 the "behavior" defined by the bindings 12 is a modification of the XML input document. For example, the XBF engine 13 processes an input document 14 retrieved from a database into a XML output document which represents only part of the input information (i.e. the processing performs a filtering), but represents additional, for example display-related, information so that the output document 52 can be displayed on a browser, like a HTML document.

Figure 8:
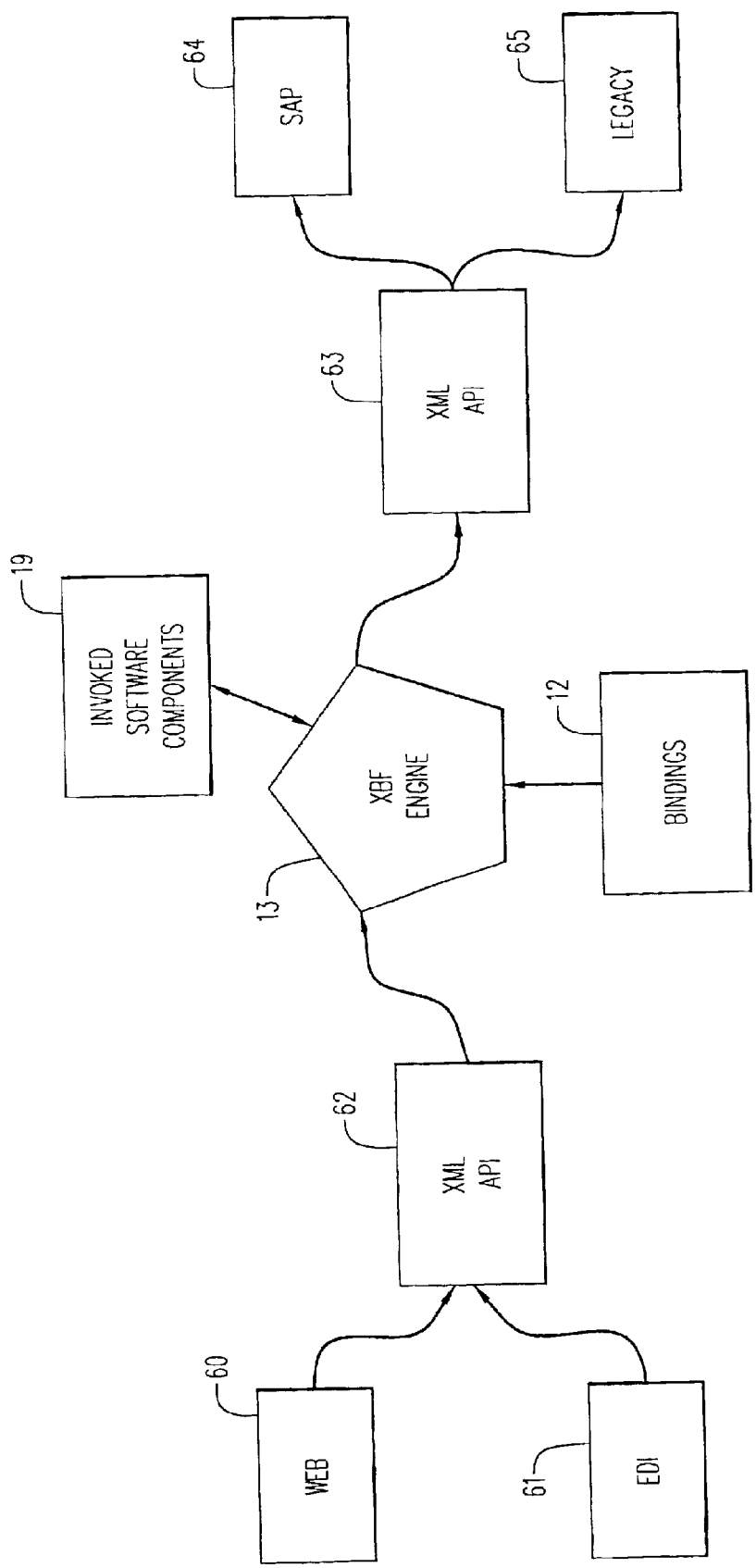
FIG. 8 is a diagram of an embodiment for transforming an XML Application Programming Interface into another.

FIG. 8 illustrates another example in which the above-described embodiments are used for transforming one Application Programming Interface (API) into another. This is particular useful to bridge legacy systems 65 or specialized applications, like ERP applications 64 (e.g. SAP) with the Web 60 or EDI 61 (EDI stands for Electronic Data Interchange and is based on standards like ANSI X12, which specifies the formats for the exchange of many standard business messages, like invoices, tags information reporting, purchase orders, notices of employment status, etc.). In the embodiment of FIG. 8, the Web 60 or EDI 61 uses a "standard" XML API 62 which is different from a special XML API 63 required for interfacing with the SAP application 64 or the legacy application 65. The XML API 62 is, for example, a "standard" SQL (Standard Query Language) database access API, embedded in XML. If the SAP application 64 or legacy application 65 do not understand the standard SQL API 62, they require a different, specialized API 63. The standard XML API 62 is transformed into the specialized XML API 63 in the above described manner, i.e. by an XBF engine 13 using bindings 12. The "behavior" defined by the bindings 12 is the transformation of the standard XML API 62 into the specialized XML API 63. The transformation can, of course, also take place into the opposite direction, from SAP 64 or legacy application 65 and its corresponding specialized XML API 63 to standard XML API 62 interface with the Web 60 or EDI 61.

Figure 6:
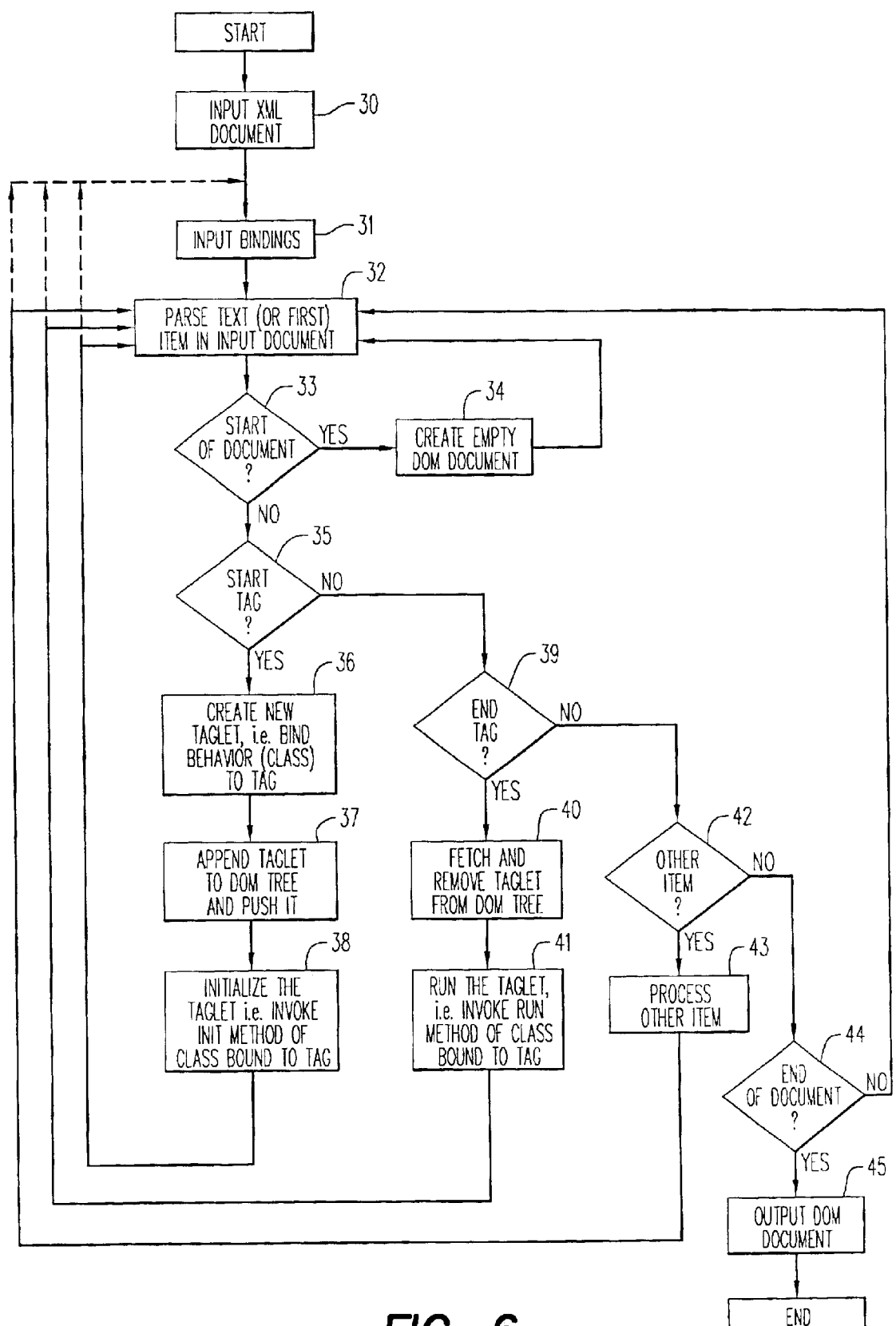
FIG. 6 is a flow diagram of a method for processing an XML input stream.
Figure 7:
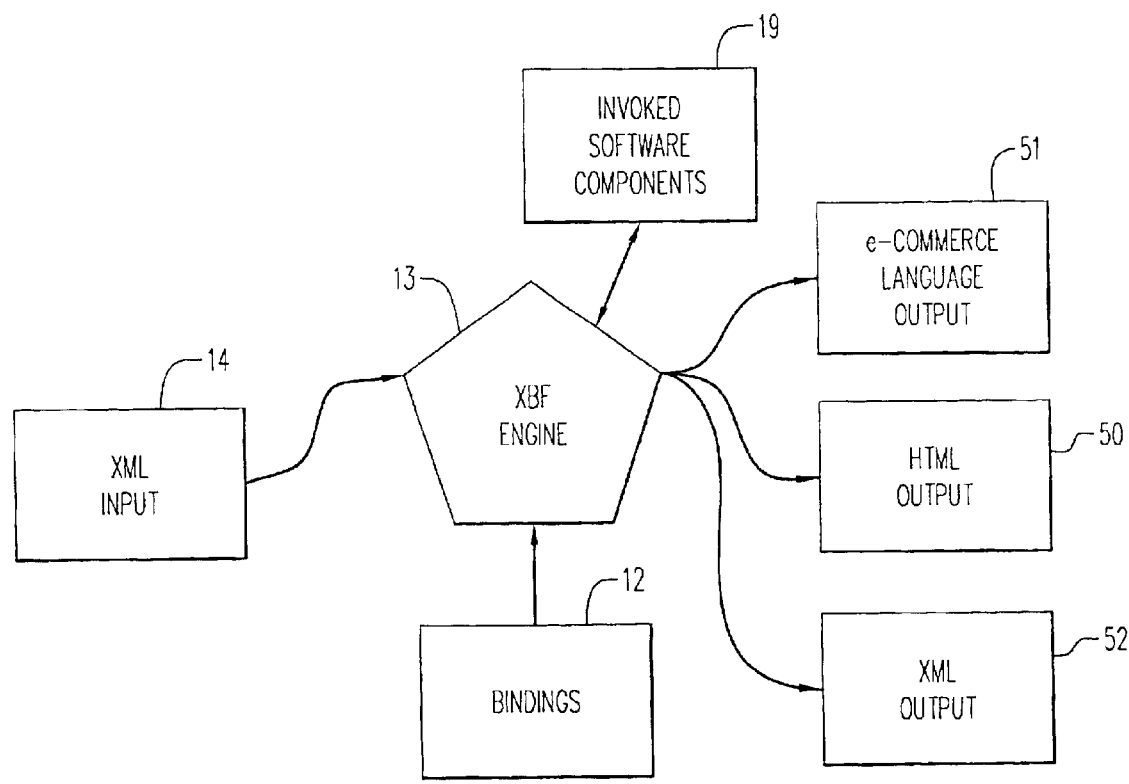
FIG. 7 is a diagram of an embodiment for transforming an XML input stream into another language.
Figure 9:
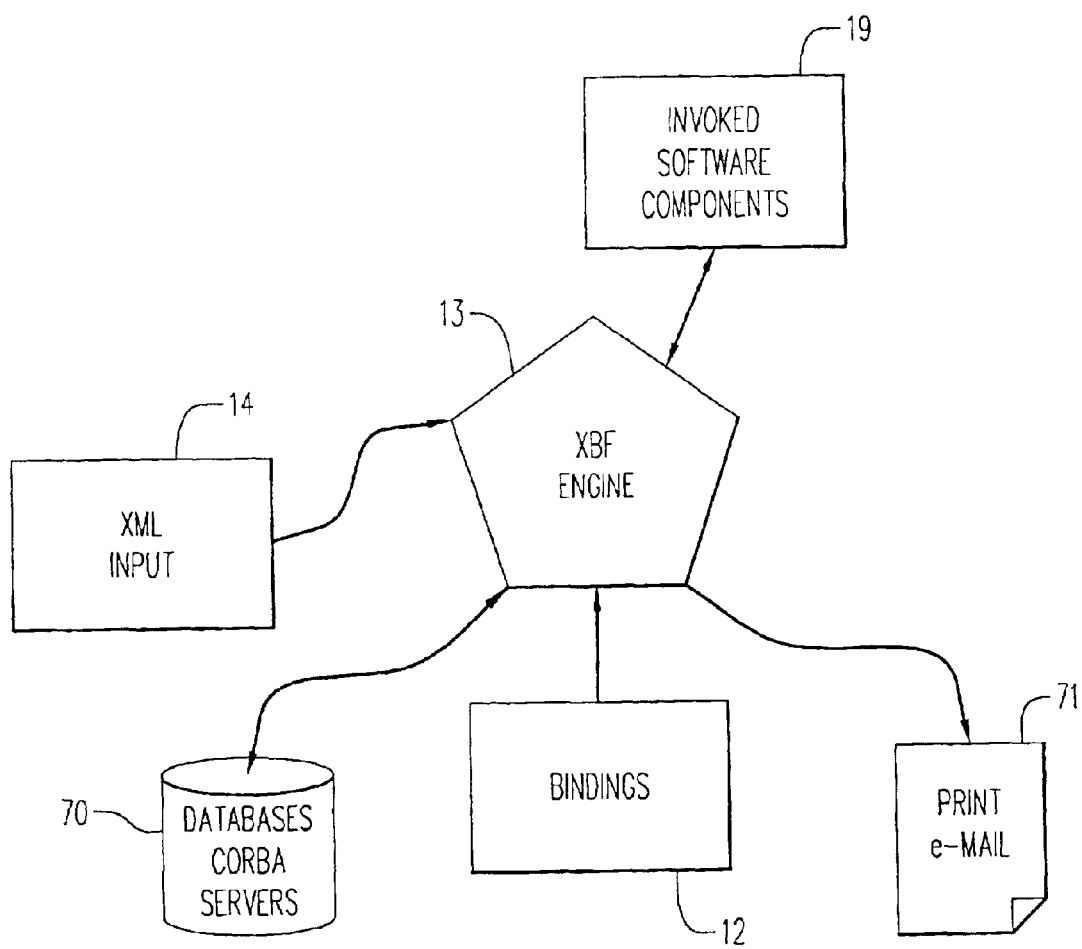
FIG. 9 is a diagram of an embodiment for using XML as an application modeling language.

Whereas FIGS. 7 and 8 show examples for transforming an XML input into a different output or to transform one interface into another, FIG. 9 illustrates how XML in connection with the method described in connection with FIGS. 5 and 6 is used as an application modeling language. XML tags and software objects (e.g. JAVA classes 19) which are bound by bindings 12 to the XML tags trigger processes, for example, access databases or CORBA servers 70, produce printouts or dispatch facsimiles or e-mails 71. When the XBF engine 13 processes the input XML document 72 and parses a tag, the JAVA class 19 bound to it as the tag is parsed. As a result, the invoked JAVA class accesses the databases or CORBA servers 70, or produces printouts or dispatches e-mails 71. In addition, a transformation process as described in FIGS. 7 and 8 can be performed, for example, a HTML or XML output document may be generated (not shown in FIG. 9).

Figure 10:
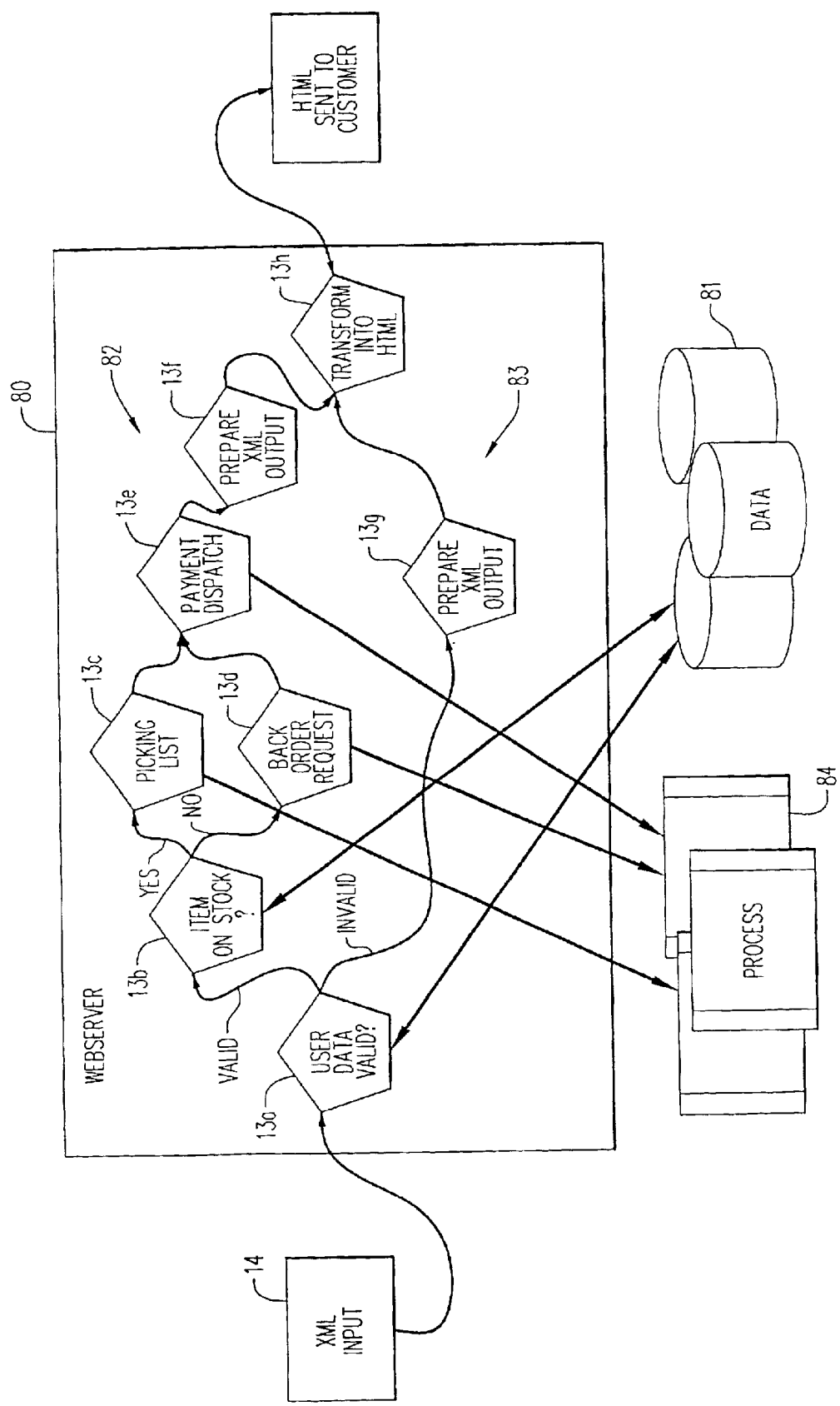
FIG. 10 is a diagram of an embodiment with several chained engines for processing XML input streams.

FIG. 10 is a diagram of an embodiment for processing XML input stream 14 with several XBF engines 13 which are chained. The XML output stream of one XBF engine forms the XML input stream of another XBF engine. The several XBF engines 13 are software objects, which execute, for example on an e-commerce Web server 80 for processing orders. Such system of chained XBF engines 13 can likewise be used for other applications with logically separable steps, like workflow applications in intranets. In such a chained system, the XML output of a particular XBF engine 13 ("first engine") of the chain may be identical with the input to this particular engine. Then, an XBF engine 13 following in the chain ("second machine") processes the same XML input stream as the first engine. A different "behavior" can be generated by the first and second engines by using different bindings so that the set of software objects invoked when the first engine processes the XML input stream is different from the one invoked when the second engine processes the (identical) XML input stream. In other words, XML is used here as a dynamic programming language, the syntax of which can differ from step to step in server or a workflow system or the like (since the first and second engines are identical, it would be technically equivalent to use one and the same machine subsequently with different bindings).

Alternatively, in a system of chained XBF engines, the "behavior" generated by a first engine may comprise a transformation of the XML input stream into a different XML output stream. Then, the second engine processes the transformed XML stream as its input stream. The differences in the input streams of the first and second engines generally cause a different behavior generated by them even if the bindings used by the second engine are identical with those used by the first engine. In addition, the bindings of the two engines can be different. The output of a first engine can also be branched so that it forms the input for two "second" engines. If the branching is not conditional, the two branches following the first engine work in parallel. If the branching is conditional (i.e. if it depends on whether a certain condition is fulfilled during the processing performed by the first engine) only one of the branches following the first engine is activated depending on the conditional result. The same effect can be achieved without branching if the bindings of the second (and further) engines are chosen dynamically depending on whether the condition has been fulfilled or not during the processing in the first engine.

In the embodiment of FIG. 10, an order is received in the form of an input XML document 14 by the Web server 80. The input document 14 is processed by a first XBF engine 13a, which checks whether user data contained in the order are valid. This check is done by corresponding software objects (JAVA classes), which are bound to user data related tag names and are invoked as such tags are found during the parsing of the input XML document 14. (In order to keep FIG. 10 simple, the bindings and software objects used by the XBF engine 13a and other XBF engines described below are not shown). The XBF engine 13a consults a database 81 and compares whether the input user data are identical with valid user data stored in the database 81. Then, a conditional branching is performed: If the input user data are valid, the further process runs through a first branch 82, otherwise through a second branch 83 by selectively outputting the XML input stream 14 to the first XBF engine 13b is of branch 82 or to the (only) XBF engine 13g of branch 83. The first XBF engine 13b of branch 82 decides whether the ordered item is in stock or not. In order to take this decision, the database 81 which stores also stock-related data is consulted. The XBF engine 13b generates two XML output documents, one includes a list of that part of the ordered items which are on stock and the other one includes a list of that part of the ordered items which are not on stock. The first mentioned output document forms the input for a subsequent XBF engine 13c which generates a picking list and initiates the corresponding picking process (this process and other processes in FIG. 10 are generally depicted by boxes 84). The other output document of XBF engine 13b forms the input for XBF engine 13d which requests a back order of the corresponding items. The XML outputs of both XBF engines 13c and 13d are input to XBF engine 13e which initiates the payment (i.e. by debiting the customer's credit card) and the dispatch of the ordered items. The next XBF engine 13f prepares an XML output document. For example, this output document is a confirmation for the customer that his order has been processed. The other branch 83 for invalid user data has only one XBF engine 13g which also prepares an XML output document. This XML output contains information for the customers that his customer data are invalid. Finally, both branches 83 and 84 are fed together into the last XBF engine 13h which transforms the respective XML output document into an HTML output document and initiates that it is sent over the Web to the customer.

Figure 11:
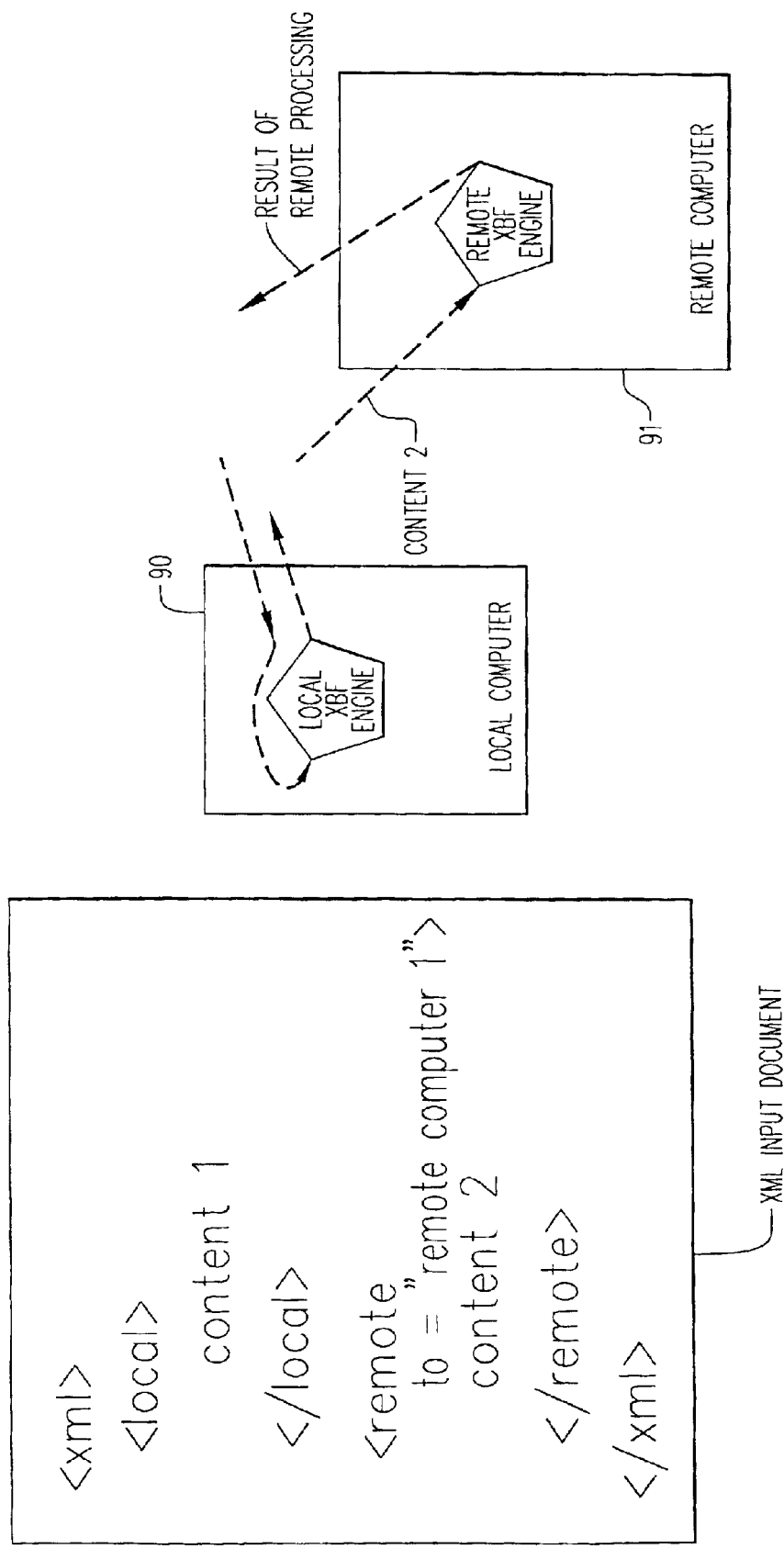
FIG. 11 illustrates an embodiment for remote processing with a local engine and a remote engine for processing XML input streams.

FIG. 11 illustrates the use of XBF engines for remote processing. The system comprises a local computer 90 which may be a laptop, a palm or an intelligent mobile phone, as well as a remote computer 91. The communication between the two computers 90 and 91 is for example carried out via e-mail, e.g. using the Simple Mail Transfer Protocol (SMTP). Both computers 90 and 91 have a XBF engine, a local XBF engine 13.1 and a remote XBF engine 13.2, respectively. (In other embodiments, only one of the two computers 90, 91 is equipped with an XBF engine 13. The processing on the respective other computer can than be performed by other (conventional) means.) On the left side of FIG. 11 is shown an example of an XML input document which shall be processed by the local computer 90. It has two parts, a local and a remote part. The local part has "content 1" between a "local" start-tag and end-tag. The remote part has "content 2" between a "remote" start-tag and end-tag. The "remote" start-tag has an attribute: to="remote computer 91".

Such a document is generated internally by the local computer 90, for example when a user puts in commands to the local computer, for instance to retrieve data from a database. The document is then input to the local XBF engine 13.1, which processes only the local tag in the way described in connection with FIGS. 5 and 6. The "content 2" bracketed by the remote tag ("content 2") is, however, not executed locally. Rather, it is sent via SMTP to the remote computer 91 and is there processed by the remote XBF engine 13.2 in the way described in connection with FIGS. 5 and 6. The result of the processing at the remote computer 91 (for example data retrieved from a remote database) is then sent to the local computer 90 and is output there, as if it were processed on the local computer 90. Therefore, the remote processing is transparent for the user; in other words, he does not become aware of the remote processing. Preferably, the result of the remote processing is also send via SMTP from the remote computer 91 to the local computer 90 in the form of an XML document. This response document generally contains only tags and data which represent what is to be output on the local computer's graphical user interface. Preferably, the input document received from the remote computer 91 is also processed by the local XBF engine 13.1. The remote processing embodiment of FIG. 11 is advantageous when the processing or storage capabilities of the local computer 90 are limited, which is generally the case with mobile computers and the like.

Thus, a general purpose of the disclosed embodiments is to provide an improved method, computer system and computer program product for processing extensible markup language data streams.

All publications and existing systems mentioned in this specification are herein incorporated by reference.

Although certain methods, systems and products constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. A method performed by a computer system of processing an extensible markup language input stream having a tag structure with start and end tags which may enclose further tags, so that the tag structure may be represented by a tree structure, the method using objects mapped to tags contained in the input stream, said objects defining start and end methods which can be invoked, the method comprising:

parsing the input stream, as a tag is found during the parsing process, building a tree representation of the input stream and the objects bound to tags by building the object mapped to the tag found into the tree representation according to the tag structure, invoking, during the parsing process, before the input stream is entirely parsed and the tree representation is entirely built, in response to finding a start tag, the start method defined in the object mapped to the tag found, and invoking, during the parsing process, before the input stream is entirely parsed and the tree representation is entirely built, in response to finding an end tag, the end method defined in the object mapped to the tag found, wherein, due to the fact that the object is built into the tree representation before one of the methods defined by it is invoked, the method invoked during the parsing process, before the input stream is entirely parsed, has awareness of the position of the tag to which it is mapped within the tree structure not yet entirely built.

2. The method of claim 1, wherein the extensible markup language is XML.

3. The method of claim 1, wherein the discrete software components are classes in an object-oriented programming language or procedures or functions in a procedural programming language.

4. The method of claim 1, wherein the end method is invoked when all children of the tag have been parsed.

5. The method of claim 1, wherein the mapping between the tags and the discrete software objects is changed before, during, or after the parsing process.

6. The method of claim 1, wherein an extensible markup language output stream is generated, and the output stream is used as an input stream for another execution of the method.

7. The method of claim 1, wherein the computer system is a server in a network, and the input stream processed by the server is comprised in a request received from a client over the network or is comprised in an output from a database.

8. The method of claim 1, wherein the invoked software components comprise at least one software component for accessing a database.

9. The method of claim 1, wherein the invoked software components comprise at least one of a software component for sending electronic mail and a software component for sending facsimiles.

10. The method of claim 1, wherein the computer system comprises a local computer and a remote computer which communicate with each other, and at least some of the commands given to the local computer are executed on the remote computer, but the results of the execution are output on the local computer so that the commands appear to be executed locally, wherein the communication between the local and the remote computers comprises an extensible markup language stream, wherein the method is performed by at least one of the remote computer and the local computer so as to execute the commands or output the results of the execution.

11. A computer system, comprising:

a processing unit and storage for processing programs, bindings representing a mapping between tags and methods of discrete software components, a software engine comprising:

a reader component arranged to read an extensible markup language input stream having a tag structure with start and end tags which may enclose further tags, so that the tag structure may be represented by a tree structure, a parser component arranged to parse the input stream, an execution component, as a tag is found during the parsing process, arranged to:

build a tree representation of the input stream and the objects bound to tags by building the object mapped to the tag found into the tree representation according to the tag structure, invoke, during the parsing process, before the input stream is entirely parsed and the tree representation is entirely built, in response to finding a start tag, the start method defined in the object mapped to the tag found, and invoke, during the parsing process, before the input stream is entirely parsed and the tree representation is entirely built, in response to finding an end tag, the end method defined in the object mapped to the tag found, wherein, due to the fact that the object is built into the tree representation before one of the methods defined by it is invoked, the method invoked during the parsing process, before the input stream is entirely parsed, has awareness of the position of the tag to which it is mapped within the tree structure not yet entirely built.

12. The computer system of claim 11, which comprises two or more of the software engines, wherein at least one of the software engines generates an extensible markup language output stream, and the output stream is used as an input extensible markup language stream for another one of the software engines.

13. The computer system of claim 11, which is a server in a network, and the extensible markup language input stream processed by the server is comprised in a request received from a user over the network or is comprised in an output from a database.

14. The computer system of claim 11, which comprises a database, and wherein the invoked software components comprise at least one software component for accessing the database.

15. The computer system of claim 11, which comprises at least one of an email dispatch system and a facsimile dispatch system, wherein the invoked software components comprise a software component for sending electronic mail or a software component for sending facsimiles.

16. The computer system of claim 13, which comprises a local computer and a remote computer which communicate with each other, and at least some of the commands given to the local computer are executed on the remote computer, but the results of the execution are output on the local computer so that the commands appear to be executed locally, wherein the communication between the local and the remote computers comprises a extensible markup language stream, and wherein at least one of the remote and the local computers has a software engine so as to execute the commands or output the results of the execution.

17. A computer program product comprising a machine-readable medium with program code stored on it, for carrying out a method, when executed on a computer system, of processing an extensible markup language input stream having a tag structure with start and end tags which may enclose further tags, so that the tag structure may be represented by a tree structure, the method using objects mapped to tags contained in the input stream, said objects defining start and end methods which can be invoked, the program code being arranged to:

parse the input stream, as a tag is found during the parsing process:

build a tree representation of the input stream and the objects bound to tags by building the object mapped to the tag found into the tree representation according to the tag structure, invoke, during the parsing process, before the input stream is entirely parsed and the tree representation is entirely built, in response to finding a start tag, the start method defined in the object mapped to the tag found, and invoke, during the parsing process, before the input stream is entirely parsed and the tree representation is entirely built, in response to finding an end tag, the end method defined in the object mapped to the tag found, wherein, due to the fact that the object is built into the tree representation before one of the methods defined by it is invoked, the method invoked during the parsing process, before the input stream is entirely parsed, has awareness of the position of the tag to which it is mapped within the tree structure not yet entirely built.

18. The computer program product of claim 17, wherein the program code comprises the following classes:

a class which parses the input stream, a class which implements a parser interface, a class which creates a document, a class which creates a taglet, i.e. which binds objects to tag names, a class which provides behavior for the taglets.

19. A signal transmitted over a computer network comprising a representation of program code for carrying out a method, when executed on a computer system, of processing an extensible markup language input stream having a tag structure with start and end tags which may enclose further tags, so that the tag structure may be represented by a tree structure, the method using objects mapped to tags contained in the input stream, said objects defining start and end methods which can be invoked, the program code being arranged to:

parse the input stream, as a tag is found during the parsing process:

build a tree representation of the input stream and the objects bound to tags by building the object mapped to the tag found into the tree representation according to the stream tag structure, invoke, during the parsing process, before the input stream is entirely parsed and the tree representation is entirely built, in response to finding a start tag, the start method defined in the object mapped to the tag found, and invoke, during the parsing process, before the input stream is entirely parsed and the tree representation is entirely built, in response to finding an end tag, the end method defined in the object mapped to the tag found, wherein, due to the fact that the object is built into the tree representation before one of the methods defined by it is invoked, the method invoked during the parsing process, before the input stream is entirely parsed, has awareness of the position of the tag to which it is mapped within the tree structure not yet entirely built.

* * * * *